June 13, 1939.                J. L. RICHTER ET AL                2,162,590
                          SIMULATED BEVEL VANITY MIRROR
                            Original Filed Dec. 14, 1936

INVENTOR.
James L. Richter
Henry Goldberg
BY
ATTORNEY.

Patented June 13, 1939

2,162,590

UNITED STATES PATENT OFFICE 2,162,590

SIMULATED BEVEL VANITY MIRROR

James L. Richter, Far Rockaway, N. Y., and Henry Goldblum, Paterson, N. J.

Substitute for abandoned application Serial No. 114,120, December 14, 1936. This application January 14, 1939, Serial No. 250,886

1 Claim. (Cl. 88—105)

The object of the present invention is to provide an inexpensive small mirror having the appearance of a bevelled-edge mirror such as used in ladies' handbags, vanity cases, etc., and to provide a process for manufacturing the mirrors rapidly and at very low cost.

This application is a substitution for abandoned application Serial No. 114,120, filed December 14, 1936.

The invention will be described with reference to the accompanying drawing, in which.

In the production of vanity mirrors for ladies' purses and the like, sections of the plate and shock glass of the desired form, as, for example, rectangular, are customarily applied to a grinding wheel to effect bevelling of the margins, and the faces opposite the bevelled face are silvered. In some cases the silvering precedes the bevelling operation. This process involves relatively substantial cost inasmuch as the labor involved in bevelling is frequently equal to the total cost of the unit.

We have discovered that it is possible to produce the bevel effect without any bevelling operation whatever and to start not from the front face of the glass sheet but from the rear face thereof, and in a process which requires simple inexpensive steps.

Figure 4:
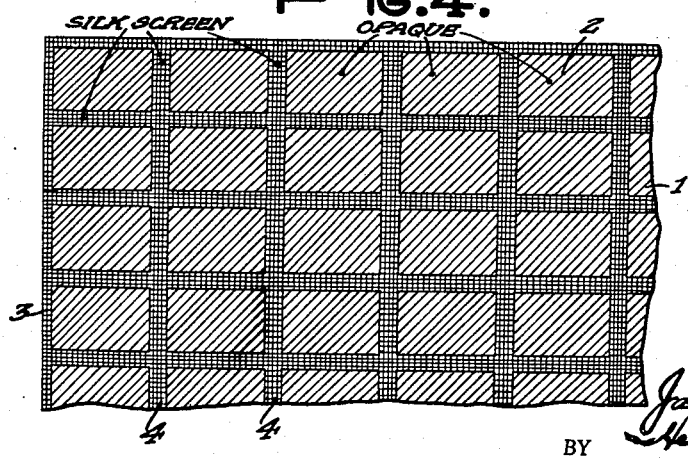
Figure 4 is a fragmentary view in plan of the etching screen.
Figure 5:
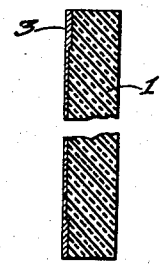
Figure 5 is a fragmentary section looking in the direction of the arrows, on the line 5—5, Figure 2.

In our process we take a large sheet of glass and produce the bevel effect on all of a considerable number of units later to be separated from each other and in such manner that bevel-like margins of all of the units will be in straight line and hence regular and without "rejects". To this end, we place upon the rear face of a large sheet of glass a selected screen such as that illustrated in Figure 4 at 1, the screen having opaque panels at 2 bounded on all four margins by a relatively narrow edging of mesh at 3, the panels being otherwise separated by relatively wide screen bands, as at 4, these bands being double the width of the mesh edging at 3. The sheet of glass may be placed on a suitable support having vertically extending guides (not shown) and the screen placed upon the glass and held in proper registry therewith by said guides. Thereupon, we place upon the screen an etching fluid in paste form such as a hydro-fluoric paste and by wiping action cause the paste to pass through the screen areas onto the glass face. The paste therefore, will be applied to the glass in confined areas conforming with the screen areas 3 and 4. The elements are left in such contact for a period of minutes sufficient to cause acid to attack the glass and form etched bands. Thereafter, the screen is withdrawn from the glass and the latter washed to remove the paste. The glass at the etched bands will appear generally like a ground glass surface.

The next step is to take the glass plate with its etched bands through the steps of a well known silvering operation by which a mirrored surface is applied to the glass, the silver also being deposited upon the etched bands. By reason of the etching of the glass at the band areas, these areas will be given a reduced reflective power in accordance with the degree of etching. We prefer that the etching be very light, as, for example, that produced by the application of the paste to the glass face for 3–4 minutes.

Figure 2:
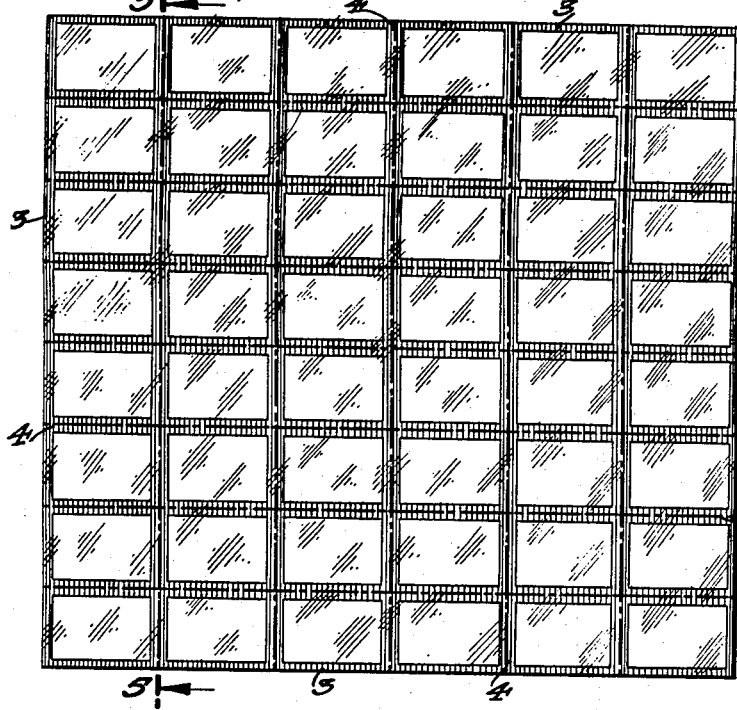
Figure 2 is a plan view of a sheet of glass following the steps of etching and silvering, and preliminary to cutting into strips and individual simulated-bevel units, showing in dotted lines the direction of cut.

The final step is to protect the mirrored surface by a backing of shellac, paint, or other quick drying coating. The front face of the large glass will then appear as in Figure 2.

Figure 1:
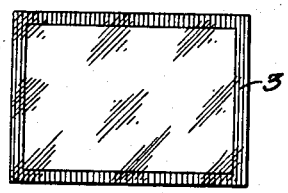
Figure 1 is a plan view of one of the mirrors.
Figure 3:
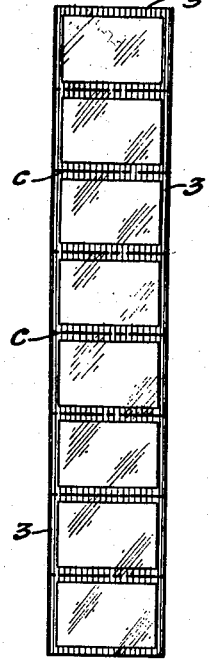
Figure 3 is a plan view of one of the cut strips.

The next step is to longitudinally cut the glass sheet, first into strips such as shown in Figure 3, by lines of cut each exactly in the center of a wide band 4, thus dividing the band in half. When this is done, each strip will be severed into sections by cutting through the remaining wide band centrally thereof on the dotted lines indicated at c. The cut edges may be backed and this will complete the article as shown in Figure 1. The finished article is such that only by close inspection would it be discovered that the front face thereof was not actually bevelled, because the article will have the effect of a bevelled mirror. Two of the articles may be cemented together back to back to form a double mirror.

Having described our invention, what we claim and desire to secure by Letters Patent, is as follows:

A method of making vanity mirrors, which comprises forming upon a sheet of glass longitudinally extending and transversely intersecting bands of etching, silvering the sheet of glass upon the etched bands and the unetched areas bounded thereby, and severing the sheet into strips by lines of cut centrally of the etched bands, and cutting the strips into individual units by lines of cut directed centrally of the etched bands intermediate the successive unetched areas.

JAMES L. RICHTER.
HENRY GOLDBLUM.